United States Patent [19]
Boussuges

[11] Patent Number: 4,958,986
[45] Date of Patent: Sep. 25, 1990

[54] CENTRIFUGAL ACTION TURBINE

[76] Inventor: Pierre Boussuges, 4, rue Béranger, F-38000 Grenoble, France

[21] Appl. No.: 297,861
[22] PCT Filed: Feb. 16, 1988
[86] PCT No.: PCT/FR88/00081
§ 371 Date: Dec. 15, 1988
§ 102(e) Date: Dec. 15, 1988
[87] PCT Pub. No.: WO88/06239
PCT Pub. Date: Aug. 25, 1988

[30] Foreign Application Priority Data
Feb. 20, 1987 [FR] France ................. 87 02251

[51] Int. Cl.$^5$ .......................... F01B 25/06; F03B 3/18
[52] U.S. Cl. ...................................... 415/188; 415/202
[58] Field of Search ............ 415/151, 157, 158, 159, 415/186, 187, 188, 202, 206

[56] References Cited
U.S. PATENT DOCUMENTS

| | | | |
|---|---|---|---|
| 174,649 | 3/1876 | Whipple | 415/187 |
| 1,656,006 | 1/1928 | Lieber | 415/157 |
| 1,889,816 | 12/1932 | White | 415/157 |
| 2,471,653 | 5/1949 | Price | 415/188 |
| 2,611,578 | 9/1952 | Biggs | 253/120 |
| 3,994,621 | 11/1976 | Bogie | 415/186 |
| 4,624,411 | 11/1986 | Won | 415/202 |
| 4,776,752 | 10/1988 | Davis | 415/202 |

FOREIGN PATENT DOCUMENTS

| | | |
|---|---|---|
| 1061171 | 4/1954 | France . |
| 1491974 | 8/1967 | France . |
| 287979 | 4/1953 | Switzerland . |
| 300139 | 9/1954 | Switzerland . |
| 451851 | 5/1968 | Switzerland . |
| 252424 | 5/1926 | United Kingdom . |

OTHER PUBLICATIONS

Patent Abstracts of Japan, vol. 8, No. 116, (M-299)(1553), 30 May 1984.
& JP, A, 5923087 (Hitachi Seisakusho K.K.) 06 Feb. 1984.

Primary Examiner—Carl D. Price
Assistant Examiner—Hoang Nguyen
Attorney, Agent, or Firm—Beveridge, DeGrandi & Weilacher

[57] ABSTRACT

A centrifugal turbine rotor is rotated by fluid from a distributor provided with fluid channels which are continuously convergent in the direction of flow. These fluid channels are also deviated with respect to the radial direction of the distributor. The centrifugally directed fluid is transmitted from the distributor through an obturator which adjusts the size of the distributor channel outlets, and across an open space where the fluid is aerated before it strikes the rotor buckets to rotate the rotor.

18 Claims, 5 Drawing Sheets

FIG. I

CENTRIFUGAL ACTION TURBINE

BACKGROUND OF THE INVENTION

The present invention concerns a centrifugal action turbine in which a centrifugal flow of fluid acts on a rotor so as to cause rotation thereof.

A turbine of this type is described in patent CH-A-300139. This turbine comprises a cylindrical tubular pipe which is closed by a radial end wall, outlet passages being provided in the peripheral wall of this pipe. The latter is surrounded by an obturator which is itself surrounded by a rotor the buckets of which have an axial dimension much greater than that of said passages. This known turbine has disadvantages. In particular, the structure of the end part of the pipe produces very large head losses and the jets formed are not guided on their axially spaced sides and can only be aerated through the rotor from the periphery thereof.

SUMMARY OF THE INVENTION

A particular aim of the present invention is to remedy these disadvantages and the present invention proposes a centrifugal action turbine with a structure enabling high efficiency to be achieved.

The centrifugal action turbine in accordance with the present invention comprises an axial fluid supply pipe and an annular bucket rotor disposed concentrically to said pipe, in which centrifugal streams of fluid are formed and deviated with respect to the radial direction, so producing jets of fluid spaced in the peripheral direction which cross the rotor to act on the buckets, causing said rotor to turn.

According to the present invention, said turbine is provided at the end of the supply pipe with a distributor disposed concentrically to said rotor, in which is arranged a great number of convergent channels, each with an inlet oriented towards the fluid supply pipe and an outlet disposed at the periphery of the distributor, in which channels said streams of fluid are formed, said bucket rotor extending to the periphery of the distributor, at a distance from its peripheral surface in such a way that the spaced jets formed fill said rotor axially and the space between the distributor and the rotor is open axially, in order that the jets may be aerated.

According to another object of the present invention, the ratio between the circumferential distance separating two adjacent peripheral outlets of the distributor multiplied by the number of outlets of the distributor and the perimeter of the latter is at least equal to 0.3.

According to another object of the present invention, the peripheral outlets of the distributor are of rectangular cross-section, the ratio between the dimension of these outlets in the direction of the axis of the distributor and their dimension in the peripheral direction being at least equal to 3.

According to another object of the present invention, the cross-section of each channel of the distributor is such that the flow of fluid is convergent from the axial fluid supply pipe to their peripheral outlet. The ratio between their outlet cross-section and the cross-section of the supply channel is preferably less than 0.6.

According to the present invention, the downstream end part of said flow channels of the distributor is preferably of rectangular cross-section.

According to the present invention, the opposite walls of the downstream end part of the flow channels of the distributor, extending along the axis thereof, are preferably parallel.

According to the present invention, the two opposite walls of the downstream end part of the flow channels of the distributor, offset towards the axis of the distributor, are convergent towards their outlet.

According to another object of the present invention, the peripheral part of the flow channels of the distributor at their inlet and in the area in which the streams of fluid are formed and deviated in said channels is formed by a toroidal spiral.

In one embodiment of the present invention said rotor comprises two rings between which its buckets are disposed.

According to the present invention, said rings are preferably disposed so that their facing surfaces converge in the direction from the interior towards the exterior.

According to the present invention, the interior edges of said rings are preferably offset relative to the opposite edges of the peripheral outlets of the distributor in the direction towards the axis thereof so as to have an axial dimension greater than the axial dimension of the outlets of the distributor.

According to the present invention, the facing surfaces of said rings of the rotor are preferably substantially parallel to the two walls of the downstream end part of the channels of the distributor offset towards the axis thereof.

According to the present invention, the wall of the downstream end part of the channels of the distributor opposite the fluid supply pipe is preferably at an angle to the axis of the distributor between 90° and 105°.

According to another object of the present invention, the turbine comprises an obturator disposed around the distributor at a distance from the rotor and adapted to extend between the latter, said obturator being movable is such a way as to adjust the size of the outlets of the flow channels of the distributor. In a first embodiment the obturator may be movable in the direction of the axis of the distributor. In another embodiment said obturator may be movable in rotation, said obturator having windows through which the jets of fluid are formed at the outlet from said channels of the distributor. The direction of rotation of said obturator to reduce the cross-section of the outlets is preferably the same as the rotation direction of the rotor. It may also be advantageous to provide seals between the obturator and the peripheral surface of the distributor.

According to another object of the present invention, said rotor comprises a plate mounted on a shaft, said plate being at a distance from the wall of the distributor opposite said fluid supply pipe, the space separating them being aerated or open.

According to another object of the present invention, said turbine is disposed in an enclosure having at least one lower fluid evacuation opening and adapted so that the rotor is not immersed, said enclosure being provided with a valve for adjusting the pressure of the air inside said enclosure.

In another embodiment, the turbine in accordance with the present invention comprises a thick-walled rotatable cylindrical obturator disposed around the distributor and at distance from said rotor, said obturator comprising through-passages the inlets of which correspond to the outlets of the channels of the distributor and extend the latter, the walls of the obturator passages and of the distributor channels being such that, in the first part of rotation movement of the obturator in the sense which reduces the peripheral thickness of the stream of fluid, and in particular in the first third thereof, the flow of the streams of fluid is convergent.

In this embodiment in particular the through-passages of said obturator may advantageously each comprise an inlet and an outlet of which the former is offset to the rear relative to the latter, each of said passages having, facing the corresponding outlet of the distributor channels, a part that is recessed relative to the cylindrical interior surface of the obturator which is arc-shaped in radial cross-section and a plane opposite wall, said opposite wall and the wall of said recessed part extending the corresponding walls of the distributor channel when the obturator is in an open position.

Said recessed part is preferably circular arc-shaped, the circle of said circular arc passing through the interior edge of said plane wall and said plane wall being parallel to a tangent at the end of the wall of said recessed part.

BRIEF DESCRIPTION OF THE DRAWINGS

The present invention will be better understood from a consideration of the centrifugal action turbines described by way of non-limiting example and shown in the drawing in which.

DETAILED DESCRIPTION OF THE INVENTION

Figure 1:
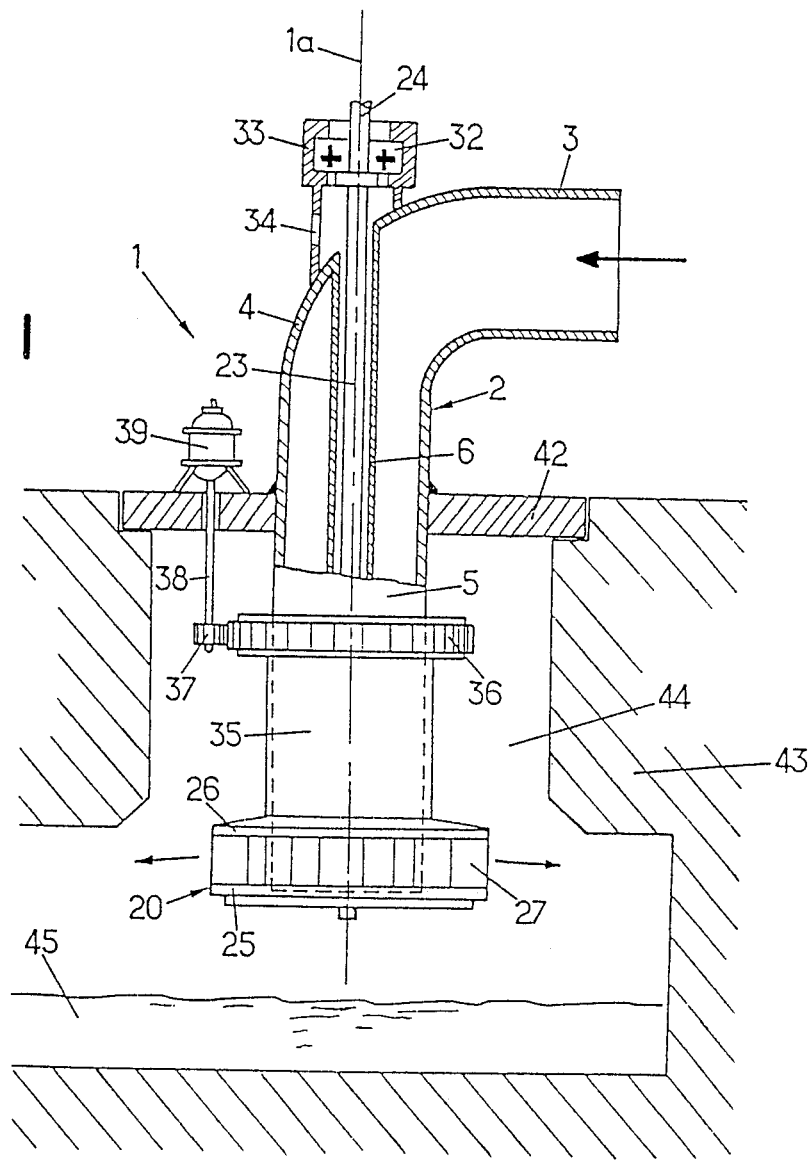
FIG. 1 represents a view in elevation, partially in cross-section, of a centrifugal action turbine in accordance with the present invention, with a vertical axis, installed on a site.

Referring to FIGS. 1 through 5, it is seen that the centrifugal action turbine represented in these figures is generally designated by the reference 1, has a vertical axis 1a and comprises an axial cylindrical pipe for supplying a fluid such as water, generally designated by the reference 2, which has in the water flow direction a horizontal part 3, an elbow-bend 4 and vertical part 5, together with a vertical and coaxial interior cylinder 6 which is joined to the exterior surface of the elbow-bend 4, the water flowing vertically downwards in the annular space between the vertical cylindrical part 5 of the pipe 2 and the interior cylinder 6.

The lower parts of the pipe 2 and of the interior cylinder 6 are terminated in such a way as to constitute a distributor generally designated by the reference 7 in which are arranged, in this example, seven channels 8 for the formation and flow of seven streams of fluid, said channels 8 being adapted to produce between their inlet 10a facing towards the pipe 2 and their outlet 10 centrifugal deviation of the streams of fluid formed, these channels being implemented in the following manner.

Figure 2:
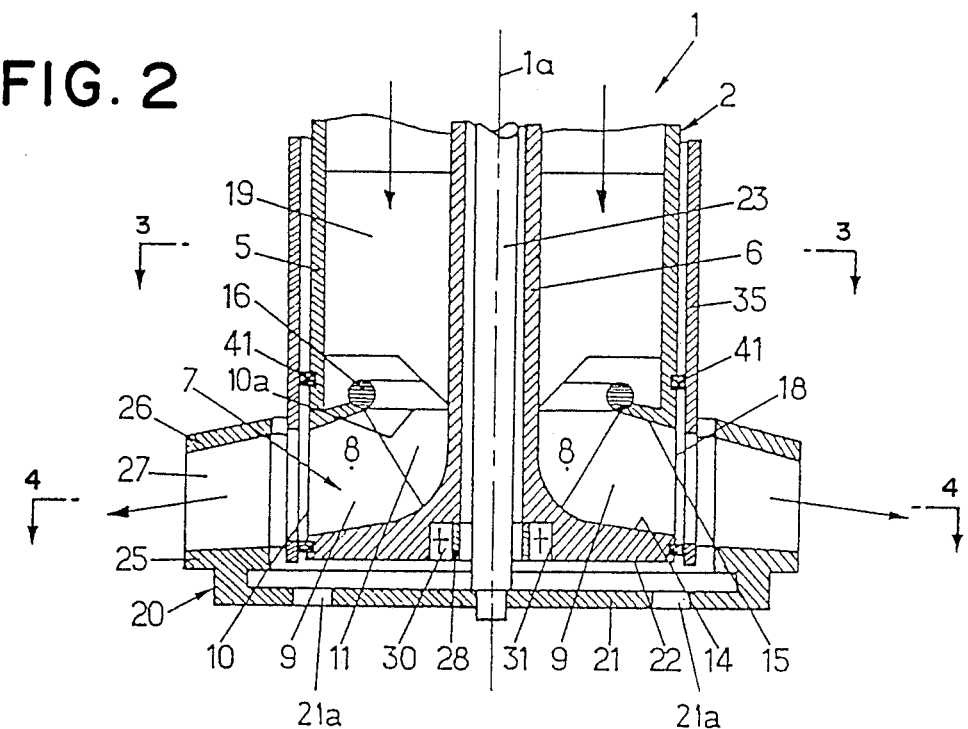
FIG. 2 represents a vertical meridian cross-section of the lower part of the turbine represented in FIG. 1, the channels of the distributor being shown folded back onto the meridian plane.
Figure 4:
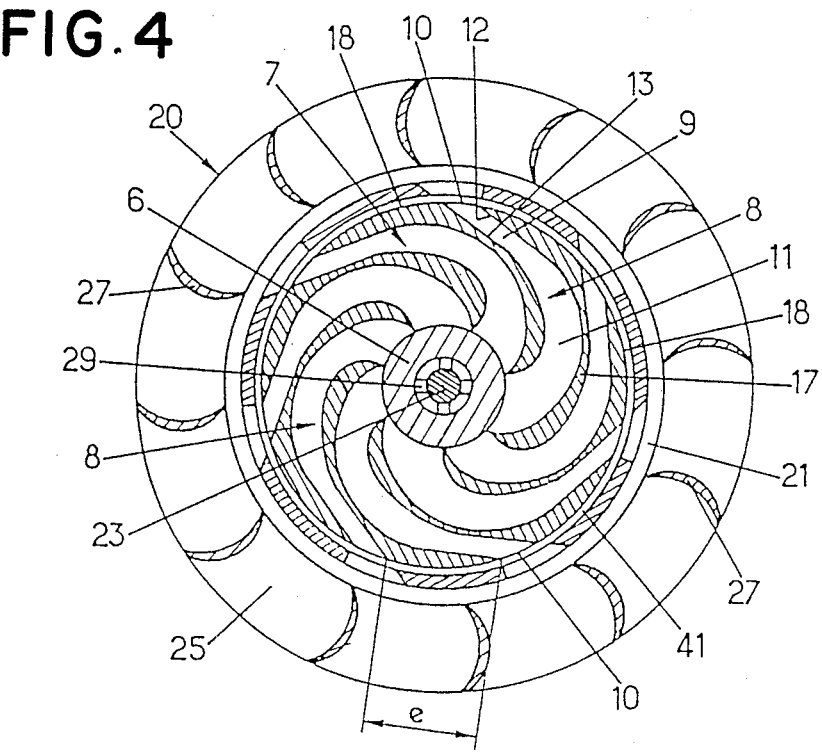
FIG. 4 represents the turbine from FIG. 1 in radial meridian cross-section on the line IV—IV in FIG. 2.

As seen clearly in FIGS. 2 and 4, the channels 8 have from the downstream end towards the upstream end a downstream end part 9 discharging at the cylindrical periphery of the vertical part 5 of the pipe 2, this part 9 being strongly inclined relative to the radial plane passing through said opening, together with an upwardly directed elbow-bend part 11 so as to join onto the interior space between the pipe 2 and the cylinder 6, these successive parts 11 and 9 being convergent in the flow direction.

The downstream end part 9 of the channels 8 is of rectangular cross-section and has two parallel vertical walls 12 and 13, a lower wall 14 inclined outwardly and downwardly and at an angle between 90° and 105° to the axis 1a of the turbine and an upper wall 15 more steeply inclined outwardly than the lower wall 14 so that this downstream end part 9 is outwardly convergent, its peripheral opening 10 being rectangular and the ratio between its height and its width being at least equal to 3. At their inlet 10a the peripheral part of the upstream part 11 of the channels 8 which joins onto the wall 15 of the downstream end part 9 is formed by an annular toroidal spiral 16 which lies in the space between the vertical cylindrical part 5 of the exterior pipe 2 and the interior cylinder 6 at a location that does not violate the laws of flow convergence.

It is seen from FIG. 4 in particular that the channels 8 are successively separated by baffles 17 which form at the periphery of the vertical cylindrical part 5 of the pipe 2 and therefore at the periphery of the distributor 7 cylindrical peripheral surfaces 18 separating the successive outlets 10 of the flow channels 8. The ratio between the circumferential distance e separating two adjacent peripheral outlets 10 of the distributor 7 multiplied by the number n of outlets 10 of the distributor 7 and the perimeter p of said distributor 7 is at least equal to 0.3, in other words: $(e \times n)/p > 0.3$.

Given the structure as described above, the streams of water that are formed at the inlet of the distributor 7 from the fluid arriving through the pipe 2 and which flow into the channels 8 leave the distributor 7 in a centrifugal manner forming jets of water spaced in the peripheral direction of the distributor 7, these jets being of rectangular cross-section and much higher than they are wide.

Figure 3:
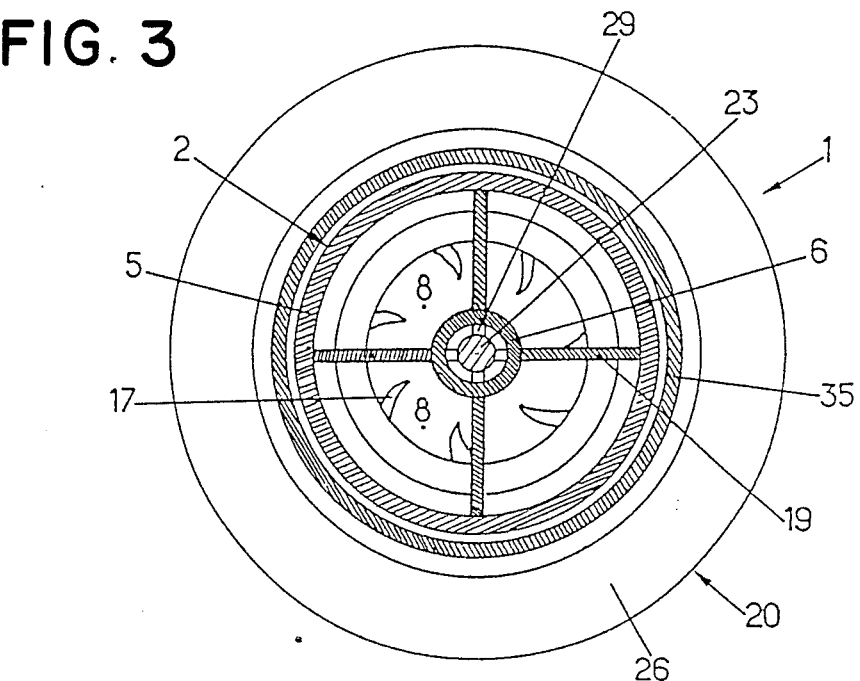
FIG. 3 represents the turbine from FIG. 1 in radial cross-section on the line III—III in FIG. 2.
Figure 5:
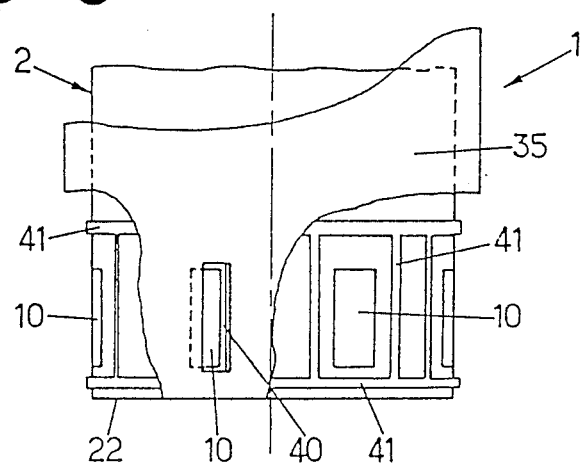
FIG. 5 represents an external view, partially in cross-section, of the turbine from FIG. 1 with its rotor removed.

It is further seen from FIGS. 2 and 3 that above the toroidal spiral 16, in this example, four vertical and radial plates 19 join the vertical cylindrical part of the pipe 2 and the interior cylinder 6 so as to reinforce the assembly and conduct the water axially.

The turbine 1 shown in FIGS. 1 through 5 also comprises a rotor generally designated by the reference 20.

Said rotor 20 comprises a radial plate 21 which lies at a distance from the radial lower end surface 22 of the distributor 7 and which is fixed to the end of an output shaft 23 which extends through the interior cylinder 6 and the upper end 24 of which extends out of the pipe 2 and may be connected to any machine to be driven.

The rotor 20 also comprises, carried by the periphery of the radial plate 21, a lower ring 25 and an upper ring 26 which are joined by a multiplicity of vertical buckets 27, of which there are 12 in this example, disposed in such a way as to face and be spaced from the outlets 10 of the channels 8 of the distributor 7. The interior edges of the rings 25 and 26 are spaced from the peripheral wall of the distributor 7 and are offset, the former downwardly and the latter upwardly, relative to the upper and lower edges of the outlets 10 the channels 8. Also, the facing surfaces of the rings 25 and 26 are inclined substantially parallel to the lower and upper walls 14 and 15 of the downstream end part 9 of the channels 8 and are convergent in the direction from the inside towards the outside, the buckets having cylindrical surfaces from the inside towards the outside, for example.

Referring to FIGS. 2 and 3, it is seen that the shaft 23 carries a ring 28 joined to its outside surface by radial members 29, a bearing 30 being disposed around said ring 28 and inside an opening 31 formed in the end wall 22 of the distributor 7. Referring to FIG. 1, it is further seen that the upper end 24 of the shaft 23 is supported by a bearing 32 which is mounted in a projecting part 33 of the elbow-bend 4 in the pipe 2, this projecting part 33 having an opening 34 communicating with the outside.

It emerges from the foregoing description that the water jets which leave the distributor 7 through the outlets 10 of the channels 8 substantially horizontally and inclined relative to the peripheral surface of the distributor 7 impinge on the buckets 27 of the rotor 20 and cause rotation of the latter, the water passing through the space delimited by the rings 25 and 26, the jets of water being separated and impinging on the rotor 20 in an independent way and said jets of water being aerated in the peripheral direction and also due to the annular gap between the interior edge of the upper ring 26 and the peripheral surface of the distributor 7 and due to the space between the interior edge of the lower ring 25 and the peripheral surface of the distributor 7 which communicates with the atmosphere through the space between the plate 21 and the lower surface 22 of the distributor 7, the space between the shaft 23 and the ring 22, the space between the shaft 23 and the interior surface of the interior cylinder 6 and the passage 34 in the projecting part 33. Also, for improved aeration of the jets, the plate 21 has through-orifices 21a distributed over its surface.

The turbine 1 is further provided with an obturator 35 consisting of a cylinder surrounding the lower part of the vertical cylindrical part 5 of the pipe 2 and which lies between the distributor 7 and the rotor 20, the interior edges of the rings 25 and 26 being spaced from the exterior surface of the obturator 35 for the purposes of the aforementioned aeration. The upper part of the obturator 35 is fitted with a toothed ring 36 with which meshes a gear 37 mounted at the end of the shaft 38 of a drive motor 39. As clearly seen in FIG. 5, the obturator 35 comprises seven windows 40 corresponding to the outlets 10 of the channels 8 of the distributor 7 and of slightly larger size, seals 41 being disposed around the outlets 10 between the peripheral wall of the distributor 7 and the interior wall of the obturator 35. Thus by virtue of the motor 38 the obturator 35 may be turned about the vertical cylindrical part 5 of the pipe 2 and consequently about the distributor 7 in such a way as to cover and close off to a greater or lesser degree the outlets 10 of the channels 8 of the distributor 7, modifying the width of the passage in which the previously described water jets are formed. The obturator 35 preferably covers the outlets 10 to reduce the flow rate by turning in the same direction as the rotor 20, that is to say in the same direction as the flow of the jets.

As seen in FIG. 1, the turbine is carried by a supporting ring 42 which is fixed to the upper part of the vertical cylindrical part 5 of the pipe 2. The peripheral edge of said ring 42 bears on a base 43 in which are formed a hollow vertical column 44 and a horizontal flow channel 45 for the water. The interior space of the column 44 and of the channel 45 is very much greater than the dimension of the lower part of the turbine 1 so as not to impede the evacuation of the water jets at the periphery of the rotor 20 and their aeration. Also, the horizontal flow channel 45 is designed so that the surface of the water to be evacuated does not reach the lower part of the rotor 20, in particular its plate 21.

Figure 6:
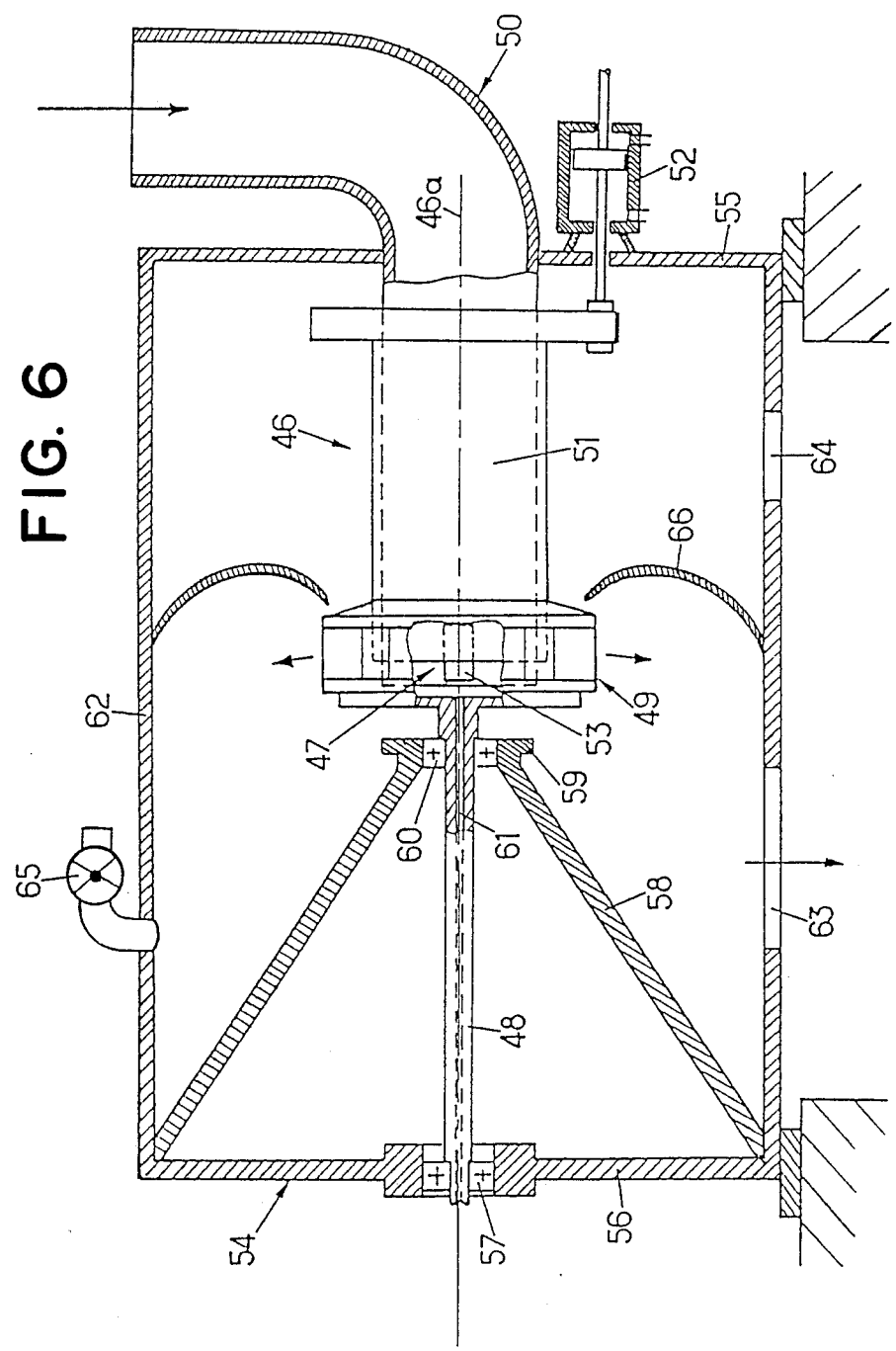
FIG. 6 represents an exterior view partially in cross-section of a second centrifugal action turbine in accordance with the present invention, with a horizontal axis.

Referring to FIG. 6, there will be described a second centrifugal action turbine generally designated by the reference 46 which differs from the turbine described with reference to FIGS. 1 through 5 only in the following particularities.

The turbine 46 has a horizontal axis 46a and no longer has any interior cylinder, the central part of its distributor 47 being solid. The output shaft 48 carrying its rotor 49 extends in the opposite direction to its water supply pipe 50. Its obturator 51 is formed by a cylinder in which there are no windows and which is movable axially along the pipe 50 and between the peripheral wall of its distributor 47 and its rotor 49 by means of an actuator 52. Axial displacement of said obturator 51 adjusts the axial dimension of the outlets 53 of the flow channels of its distributor 47 by partially covering said outlets.

Furthermore, the turbine 46 is placed in a closed enclosure 54 which has one wall 55 in the vicinity of the elbow-bend in the supply pipe 50, an opposite wall 56 through which the shaft 48 passes and on which the latter is rotatably mounted by means of a bearing 57, said wall 56 supporting a frustoconcial wall 58 extending towards its rotor 49 the radial end part 59 of which also has the shaft 48 passed through it, being rotatably mounted in it by means of a bearing 60.

In order to aerate the jets of water leaving the distributor 47 and travelling towards the rotor 49, as previously, the shaft 48 now has a central longitudinal passage 61 connected to the atmosphere.

Also, the enclosure 54 has a peripheral jacket 62 widely spaced from the turbine 46, said jacket 62 having in its lower part fluid evacuation openings 63 and 64 the size of which is such that water not yet evacuated does not reach the lower peripheral edge of the rotor 49. There is further provided in the enclosure 54 an annular baffle 66 at the same end as the supply pipe 50, facing the frustoconical wall 58, said baffle serving as a deflector to prevent any return of water onto the rotor 49.

Connected to the enclosure 54 is a pipe fitted with a valve 65 for adjusting the pressure inside the enclosure 54 and in particular for creating a reduced pressure favoring the flow of water in the turbine 46.

The arrangement of the turbine 46 from FIG. 6 could of course be applied equally well to the turbine 1 from FIGS. 1 through 5 in such a way as to cause a pressure reduction in the vertical hollow column 44 sourrounding its rotor 20. In this case, a baffle partially shutting off the outlet channel 45 and a valve place on a pipe passing through the supporting ring 42 could be provided.

Figure 7:
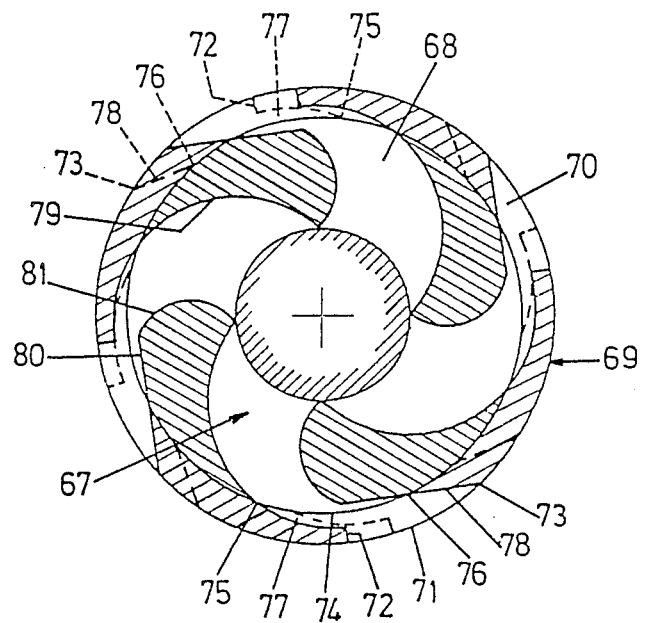
FIG. 7 represents a meridian cross-section of one embodiment of a distributor and an obturator adapted to be fitted to either of the aforementioned turbines, in a fully open position.

Referring to FIG. 7, it is seen that there is shown a distributor generally designated by the reference 67 which has a cylindrical external surface and which is distinguished from the distributors in the previous examples by the fact that it comprises four channels 68 and that there is provided around said distributor 67 a thick-walled cylindrical obturator 69 in which are formed four through-passages 70 corresponding to the four channels 68 of the distributor 67. Said cylindrical obturator 69 is pivotally mounted, for example using the same means as the obturator 35 of the example shown in FIG. 1, a bucket rotor (not shown) being disposed around and spaced from the obturator 69 as in the previous examples.

Each passage 70 has an outlet 71 having two vertical edges 72 and 73 and an inlet 74 which, given the direction of closure of the obturator 69, is offset to the rear relative to the outlet 71 and which has two vertical edges 75 and 76.

Between the corresponding rear edges 72 and 75 each passage 70 comprises a hollow part 77 set back relative to the cylindrical interior surface of the obturator 79, said hollow part 77 being circular arc-shaped in cross-section with the circle of said arc passing through the opposite vertical edge 76 of the inlet 71 of the passage 70. Between its corresponding forward edges 73 and 76 each passage 70 comprises a plane wall 78 opposite its hollow part 77.

In FIG. 7, in which the obturator 69 is in the fully open position, it is seen that the vertical edges 75 and 76 of the inlet of each passage 70 of the obturator 69 correspond to the vertical edges of the outlet of each channel 68 of the distributor 67. It is also seen that the circular arc wall of each hollow part 77 of each passage 70 extends the concave wall 79 of each channel 68 of the distributor 67 and that the plane wall 78 of each passage 70 extends a plane end part 80 of the convex wall 81 of each channel of the distributor 67, the space between said walls 79 and 81 of the distributor 67 being convergent.

Also, in this example the plane walls 78 and 80 are parallel to a tangent to the hollow part 77 at its end and the edge 72 is situated opposite the middle of the inlet 74 of the passage 70 and opposite the anterior part of the plane part 80.

It follows that the flow channel lying between the wall 79 of each channel 68 of the distributor 67 and the wall of the hollow part 77 of each passage 70 of the obturator 69, on the one hand, and the wall 81 of each channel 68 of the distributor 67, in the part situated upstream of its terminal plane part 80, on the other hand, is convergent.

Also, the shape of the plane terminal part 80 of the convex wall 81 of each channel 68 of the distributor 67 and the shape of the wall of the hollow part 77 of each passage 70 of the obturator 69 are such that during the first part of closure movement of the obturator 69, preferably up to one third of this closure movement, the channel that they delimit remains convergent in order to prevent any turbulent separation of the flowing fluid and any destructuring of the jet which forms at the outlet and so as to be able to obtain at least in this first part of the closure movement effective adjustment of the jet. In FIG. 7 part of the obturator 69 in this position is shown in dashed outline.

The distributor as just described with reference to FIG. 7 is particularly suitable for use when the turbine fitted with a distributor of this kind operates under a high head.

The present invention is not limited to the examples described hereinabove. Many other embodiments are feasible without departing from the scope of the appended claims.

I claim:

1. Centrifugal action turbine comprising:
   an axial fluid supply pipe;
   a distributor placed at one end of said fluid supply pipe and adapted to form centrifugal jets of fluid deviated with respect to the radial direction and spaced in the peripheral direction;
   a bucket rotor disposed concentrically to and around said distributor, said rotor including inner channels having inlets facing the peripheral surface of the distributor such that said jets pass through the rotor and cause rotation thereof;
   said jets being formed through continuously convergent deviating channels within said distributor, said channels of the distributor having inlets turned toward the fluid supply pipe and outlets at the peripheral surface of the distributor;
   said rotor being spaced a distance from the peripheral surface of the distributor such that jets flowing out of the distributor and through the rotor are aerated between the distributor and the rotor;
   and an obturator disposed between the distributor and the rotor, said obturator being movable to adjust the cross-section of the outlets of the channels of the distributor.

2. Centrifugal action turbine according to claim 1, wherein the downstream ends of the distributor channels are of rectangular cross-section, the opposite walls thereof, along the axis of the distributor, being parallel and the other opposite walls thereof being convergent toward their outlet.

3. Centrifugal action turbine of claim 2, wherein the ratio between the product of the circumferential distance separating two adjacent outlets of the distributor and the number of outlets of the distributor, and the perimeter of the distributor is at least 0.3.

4. Centrifugal action turbine of claim 2, wherein the ratio between the axial dimension of the outlets of the distributor and the peripheral dimension thereof is at least 3.

5. Centrifugal action turbine according to claim 1, wherein the ratio between the cross-section of said outlets of the distributor channels and the cross-section of the fluid supply pipe is less than 0.6.

6. Centrifugal action turbine according to claim 2, wherein the channels of the rotor have opposite walls parallel to the said other opposite walls of the distributor and offset relative to the latter so as to have an axial dimension greater than the axial dimension of the outlets of the distributor.

7. Centrifugal action turbine according to claim 2, wherein the distributor channels have a wall with an end part opposite to the fluid supply pipe, said well being at an angle to the axis of the distributor between 90 degrees and 105 degrees.

8. Centrifugal action turbine according to claim 1, wherein said rotor includes two rings between which rotor buckets are disposed.

9. Centrifugal action turbine according to claim 8, wherein said rings are disposed so that their facing surfaces converge in the direction from the interior to the exterior.

10. Centrifugal action turbine according to claim 1, wherein said rotor includes a plate mounted on a shaft, said plate being at a distance from a wall of the distributor opposite said fluid supply pipe, said distance providing a space which is aerated or open.

11. Centrifugal action turbine according to claim 1, wherein said distributor is movable in the direction of the axis of the distributor.

12. Centrifugal action turbine according to claim 1, wherein said obturator is movable in rotation, said obturator having windows through which the jets of fluid are formed at the outlets of said channels of the distributor.

13. Centrifugal action turbine according to claim 1, wherein said obturator is a thick-walled rotatable obturator having through-passages, the obturator passages extending the distributor channels in such a way that the flow of the fluid is convergent from the inlets of the channels of the distributor to the outlets of the obturator when the obturator is in an open position.

14. Centrifugal action turbine according to claim 12, wherein the direction of rotation of said obturator to reduce the cross-section of the outlets of the distributor is the same as the rotation direction of the rotor.

15. Centrifugal action turbine according to claim 13, wherein the direction of rotation of said obturator to reduce the cross-section of the outlets of the distributor is the same as the rotation direction of the rotor.

16. Centrifugal action turbine according to claim 1, wherein seals are provided between the obturator and the peripheral surface of the distributor.

17. Centrifugal action turbine according to claim 1, wherein said turbine is disposed in an enclosure having at least one lower fluid evacuation opening, said enclosure being adjusted so that the rotor is not immersed, and said enclosure being provided with a valve for adjusting the pressure of the air within the enclosure.

18. Centrifugal action turbine according to claim 13, wherein the through-passages of said obturator each include an inlet and an outlet of which the former is offset to the rear relative to the latter, each of said passages having, facing the corresponding outlet of the distributor channels, a part that is recessed relative to the cylindrical interior surface of the obturator which is arc-shaped in radial cross-section and a plane opposite wall, said opposite wall and the wall of said recessed part extending the corresponding walls of the distributor channel when the obturator is in an open position.

* * * * *